Aug. 1, 1933.  H. A. UNKE  1,920,449

PIPE JOINT

Filed July 2, 1931

INVENTOR:
HERMAN A. UNKE.

BY Kwis Hudson & Kent.
ATTORNEYS

UNITED STATES PATENT OFFICE 1,920,449

PIPE JOINT

Herman A. Unke, Cleveland, Ohio

Application July 2, 1931. Serial No. 548,303

5 Claims. (Cl. 285—111)

This invention relates generally to pipe connections, and more particularly to a novel form of pipe coupling and to the novel pipe joint produced thereby.

An object of this invention is to provide a novel coupling for aligning and properly spacing adjacent pipe ends, which are to be welded together.

Another object of this invention is to provide a novel pipe coupling having means projecting therefrom for spacing adjacent pipe ends which are to be welded together.

A further object of this invention is to provide a novel joint for adjoining pipe ends, wherein a sleeve telescoping into said ends cooperates with the latter to align and space the same and to form a groove for a pipe connecting weld.

Other objects and advantages of this invention will be apparent from the following description, when taken in conjunction with the accompanying sheet of drawing, wherein Fig. 1 is a longitudinal sectional view showing a pipe joint embodying my invention.

In the accompanying drawing, to which detailed reference will presently be made, I have shown a novel form of coupling for use in properly spacing and aligning adjacent pipe ends which are to be welded together, and have also shown the novel pipe joint embodying such a coupling. Before proceeding with the detailed description of the coupling and the pipe joint produced thereby, it will be understood, of course, that although I have shown the preferred structural embodiments, my invention may assume other forms than those herein illustrated.

Figure 1:
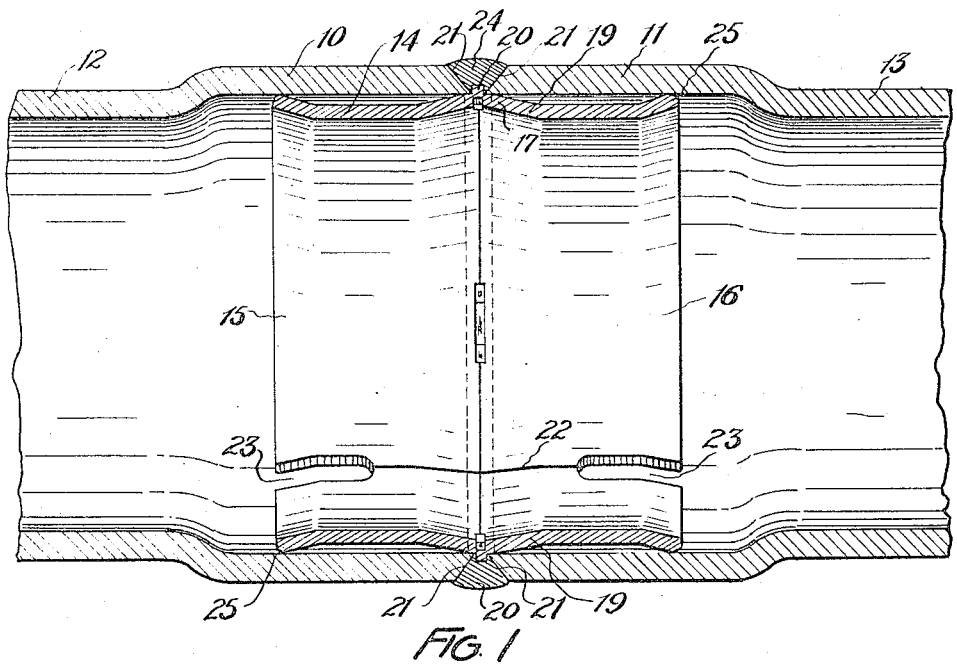

In Fig. 1 of the drawing, I have shown a pipe joint constructed according to my invention and comprising adjacent bell-ends 10 and 11 of axially aligned pipe sections 12 and 13, and a coupling or aligning bushing 14, which telescopes into the bell-ends and spans the space therebetween. The pipe sections referred to may form a part of a pipe line for conducting gases, fluids or the like, and although these pipe sections are here shown as having bell-ends, obviously, my pipe coupling could be employed with pipe sections having plain ends. The use of pipe sections having bell-ends is preferable, however, because the increased internal diameter of the bell-ends accommodates the coupling or alignment bushing 14 without materially reducing the internal diameter of the pipe line.

Figures 2, 3:
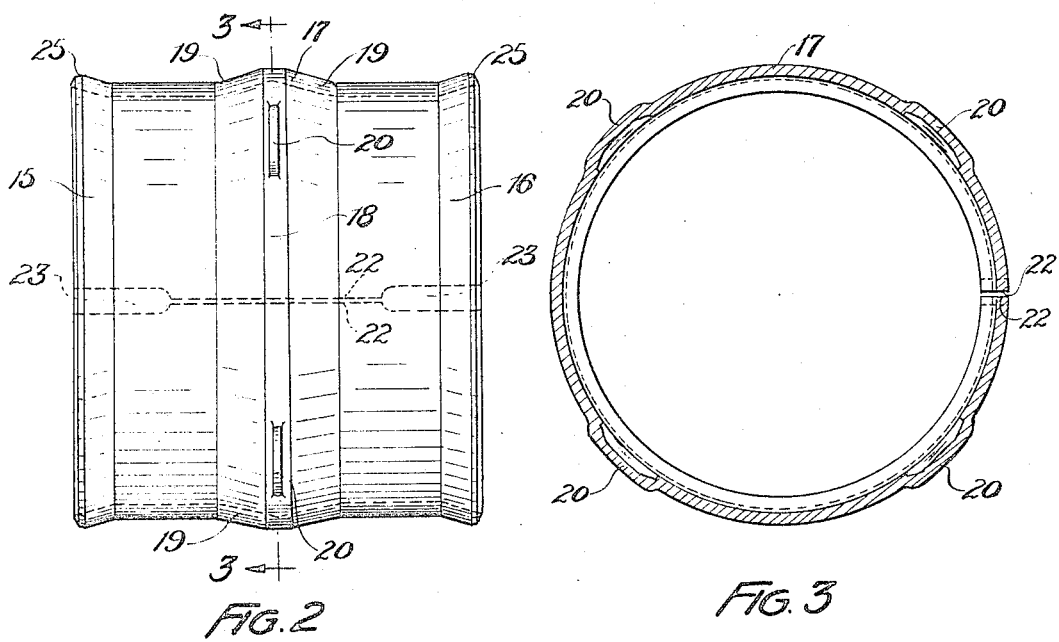
Fig. 2 is a side elevation of a pipe coupling embodying my invention.
Fig. 3 is a transverse sectional elevation taken on line 3—3 of Fig. 2.

The pipe coupling or alignment bushing itself, comprises a metal sleeve which may be formed from strip stock curved to substantially cylindrical shape, as shown in Figs. 2 and 3. This coupling may be formed from sheet metal by suitable stamping or rolling operations, or by a combination of such operations.

As shown in Fig. 1, this sleeve is formed with flared ends 15 and 16 which are adapted to telescope into the bell-ends 10 and 11 and an external annular bead or bulge 17 which is located intermediate the flared ends 15 and 16, and which spans the ends of the pipe sections. As clearly shown in Figs. 1 and 2, the bead 17 is formed with a substantially cylindrical central section or band 18 and with annular sections 19 tapering in opposite directions from the cylindrical section. At circumferentially spaced points the section 18 is provided with outwardly projecting lugs 20 which extend between, and are engaged by, the adjacent pipe ends so as to space the latter apart. These lugs may be provided in any desired number, and may be formed by displacing or shearing slugs of metal from the section 18 but leaving the slugs integrally attached. It should be noted that the thickness of the lugs is somewhat less than the width of the cylindrical section 18, so that when the sides of the lugs are abuttingly engaged by the pipe ends, the cylindrical section will extend part way into both pipe ends. The cylindrical section 18 thus cooperates with the end faces 21 of the pipe walls to form an annular welding channel or groove, the cylindrical section forming the bottom wall of the groove. The ends of the pipe sections may be beveled or tapered, in which case the side walls of the welding groove will be oppositely inclined, as shown in Fig. 1.

In forming my pipe coupling or alignment bushing, I use a blank which is so shaped that when the same is curved or bent to split-sleeve form, the edge portions 22 thereof will be in opposed, slightly spaced relation, as shown in Figs. 2 and 3. The coupling thus formed is somewhat resilient, and when the same is assembled into the pipe ends and the latter are moved toward each other for engagement with the lugs 20, the pipe ends exert a wedging action on the tapered annular sections 19 thereby tending to reduce the diameter of the coupling. Upon sufficient relative movement between the coupling and the pipe ends to bring the latter into engagement with the lugs 20, the diameter of the coupling will have been sufficiently reduced to take up the space between the edges 22 and to press the latter together in tightly abutting relation. Thus when properly assembled in place, the coupling is tightly wedged in the pipe ends and forms a continuous bottom wall for the welding groove without cracks or openings through which molten metal could flow into the pipe line while the weld is being made.

Since the dimensions of the pipe sections to be joined, may vary somewhat, it may be desirable to be able to deflect the ends of the coupling when the latter is assembled into the pipe ends. To permit such deflection I provide the slots or recesses 23 in the wall of the sleeve at both ends thereof. These slots may be formed by notching out edge portions of the blank, which when brought in registration by the curving of the blank to sleeve form, will provide the slots as shown in Figs. 1 and 2.

It will be understood, of course, that the coupling is made of appropriate length and thickness of material, so that when assembled in place in the pipe ends, it will have the desired aligning effect.

In forming a pipe joint with my alignment bushing or coupling the flared ends 15 and 16 are inserted into the pipe ends to be joined. The pipe sections are then driven or forced toward each other causing the ends thereof to engage the lugs 20. During this operation the opposed edges 22 are pressed tightly together by the wedging action of the pipe ends on the tapered portions 19. If the pipe ends should be slightly irregular or somewhat undersize the slots 23 will allow sufficient deflection or compression of the ends of the coupling to permit the same to be forced into the pipe ends. After the coupling has been assembled in place, as just described, the pipe sections are connected by a weld 24 which is formed in the groove provided between the spaced pipe end.

If desired the flared ends 15 and 16 may be chamfered, as indicated at 25, to facilitate the insertion of the coupling into the pipe ends.

It will now be readily understood that I have provided a novel and improved form of welded pipe joint, as well as a novel pipe coupling for use in forming such joints. By the use of the pipe coupling which I have devised, the pipe sections which are to be connected together, are held in proper alignment, and with their ends in properly spaced relation. Moreover, the cooperation between the coupling and the pipe ends, results in the provision of a fluid-tight annular welding groove which retains the molten metal, thus not only facilitating the formation of the weld, but also preventing leakage of molten metal between the pipe ends, which would cause icicles, fins or other obstructions within the pipe line. It will also be seen that the flared ends of the coupling will readily permit a swab or the like to be drawn through the pipe line without obstruction or snagging.

While I have illustrated and described the device of my invention in a detailed manner, it should be understood, however, that I do not intend to limit myself to the precise details of construction and arrangement of parts illustrated and described, but regard my invention as including such changes and modifications as do not involve a departure from the spirit of the invention and the scope of the appended claims.

Having thus described my invention, I claim:

1. An aligning and coupling device for adjacent pipe ends comprising a split metal sleeve adapted to telescope into said pipe ends, said sleeve having oppositely tapered annular sections for wedging engagement with said pipe ends whereby the split wall of said sleeve is compressed to substantially closed tubular form, said sleeve also having a substantially cylindrical section intermediate said tapered sections for cooperation with said pipe ends after the latter have traversed said tapered sections.

2. A pipe joint comprising axially aligned pipe ends, a split metal sleeve telescoping into said pipe ends, said sleeve having oppositely tapered annular sections intermediate its ends for wedging engagement with said pipe ends as the latter are moved toward each other whereby the split wall of said sleeve is compressed to substantially closed tubular form, said sleeve also having a cylindrical section intermediate said tapered sections for cooperation with said pipe ends in forming an annular groove after the pipe ends have traversed said tapered sections, and a weld in said groove joining said pipe ends.

3. An aligning and coupling device for adjacent pipe ends comprising a split metal sleeve adapted to telescope into said pipe ends, said sleeve having oppositely tapered annular sections for wedging engagement with said pipe ends whereby the split wall of said sleeve is compressed to substantially closed tubular form, said sleeve also having a substantially cylindrical section intermediate said tapered sections for cooperation with said pipe ends after the latter have traversed said tapered sections and substantially radially extending abutment means on said cylindrical section and located substantially midway between the ends of such cylindrical section for engagement with said pipe ends.

4. An aligning and coupling device for adjacent pipe ends comprising a split metal sleeve adapted to telescope into said pipe ends, said sleeve having oppositely tapered annular sections for wedging engagement with said pipe ends whereby the split wall of said sleeve is compressed to substantially closed tubular form, said sleeve also having a substantially cylindrical section intermediate said tapered sections for cooperation with said pipe ends after the latter have traversed said tapered sections and circumferentially aligned substantially radially extending lugs formed integral with said cylindrical section and located substantially midway between the ends of such cylindrical section for engagement with said pipe ends.

5. A pipe joint comprising axially aligned pipe ends, a split metal sleeve telescoping into said pipe ends, said sleeve having oppositely tapered annular sections intermediate its ends for wedging engagement with said pipe ends as the latter are moved toward each other whereby the split wall of said sleeve is compressed to substantially closed tubular form, said sleeve also having a cylindrical section intermediate said tapered sections for cooperation with said pipe ends in forming an annular groove after the pipe ends have traversed said tapered sections and abutment means on such cylindrical section substantially midway between the ends thereof and engaging said pipe ends for retaining said cylindrical section in spanning relation to the pipe ends, and a weld in said groove joining said pipe ends.

HERMAN A. UNKE.